United States Patent [19]

Crebouw

[11] Patent Number: 5,090,028
[45] Date of Patent: Feb. 18, 1992

[54] METHOD OF AND APPARATUS FOR SYNCHRONIZATION BY MEANS OF CORRELATION

[75] Inventor: Jean-Luc Crebouw, Saint Remy les Chevreuse, France

[73] Assignee: U.S. Philips Corporation, New York, N.Y.

[21] Appl. No.: 558,715

[22] Filed: Jul. 27, 1990

[30] Foreign Application Priority Data

Jul. 28, 1989 [FR] France ................ 89 10188

[51] Int. Cl.$^5$ .......................... H04L 7/00
[52] U.S. Cl. .......................... 375/106; 375/96
[58] Field of Search ........... 375/1, 93, 94, 96, 97, 375/106, 114, 115, 116; 364/728.03, 819; 328/155; 455/257

[56] References Cited

U.S. PATENT DOCUMENTS

| 4,203,071 | 5/1980 | Bowles et al. | 375/115 |
| 4,238,739 | 12/1980 | Mosley et al. | 331/25 |
| 4,485,477 | 11/1984 | Nossen | 375/97 |
| 4,527,278 | 7/1985 | Deconche et al. | 375/97 |
| 4,621,365 | 11/1986 | Chiu | 375/115 |
| 4,649,543 | 3/1987 | Levine | 375/116 |
| 4,829,543 | 5/1989 | Borth et al. | 375/96 |
| 4,847,869 | 7/1989 | Labedz et al. | 375/114 |

FOREIGN PATENT DOCUMENTS 2206267 6/1987 United Kingdom .

Primary Examiner—Stephen Chin
Attorney, Agent, or Firm—David R. Treacy

[57] ABSTRACT

Method and apparatus for synchronizing data by means of correlation implies that a sync codeword SQ is known at the receive end. The detection of the appearance of this word is effected by correlating codeword portions (SQ1, SQ2, ..., SQ8) locally generated with the aid of the received codes stored in the memory circuit (22).

3 Claims, 4 Drawing Sheets

METHOD OF AND APPARATUS FOR SYNCHRONIZATION BY MEANS OF CORRELATION

A) Field of the Invention

The present invention relates to a method and apparatus for synchronisation by means of correlation, which comprises a first stage when synchronisation data representing a synchronisation sequence, centred around a carrier frequency, are received, a second partial correlation stage when the correlation of the received data with parts of the locally generated sync sequence is effected, a third stage for producing an error indication at the received carrier frequency on the basis of partial correlations and a fourth stage for using a correlation peak.

B) Background of the Invention

The invention finds important applications especially in the domain of data transmission over digital radio channels where there are strict constraints due to considerable disturbance which these channels are subjected to.

French Patent Specification No. 2 525 055 which corresponds to commonly owned U.S. Pat. No. 4,527,278 describes such a method that satisfies any requirement concerning the precision of the synchronisation. However, it has been established that the calculation load was too high for certain applications.

It is an object of the invention to provide a method that implies less computation so that when the method is implemented by means of a microprocessor, the latter may be assigned to carry out additional tasks.

C) Summary of the Invention

For this purpose, a method of the type mentioned in the preamble is characterised in that in the third stage partial correlations are selected that have been carried out during the second stage and the error indication is established on the basis of these selected correlations.

D) Brief Description of the Drawings

The following description, accompanied by the annexed drawings, all given by way of non-limiting examples, will make it better understood how the invention can be implemented, in which.

E) Description of (Preferred) Embodiment(s)

Figure 1:
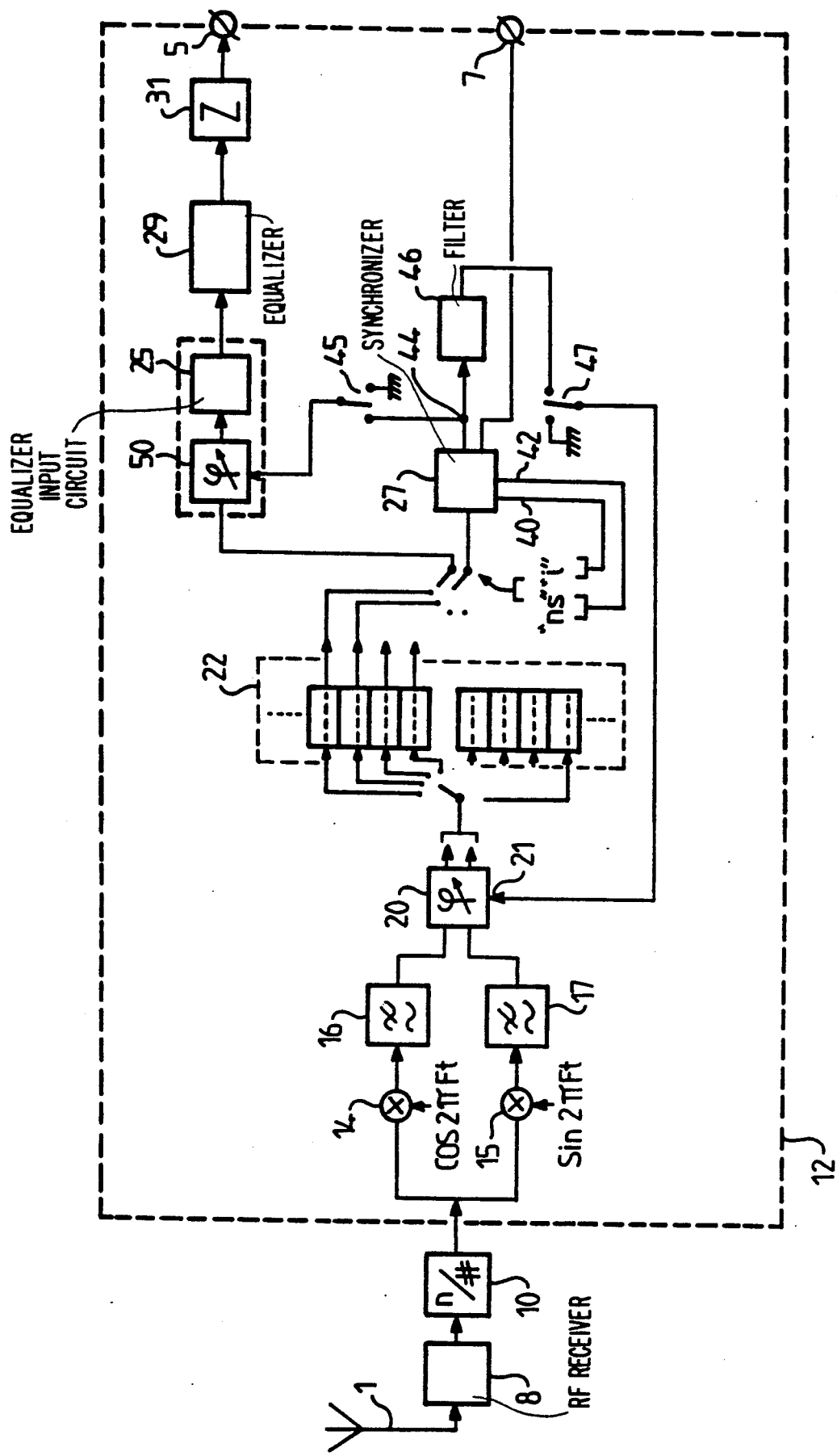
FIG. 1 is a diagram showing a receiver that permits implementing the method according to the invention.

In FIG. 1 reference 1 indicates an antenna which receives data transmitted in the high frequency range, that is to say, in a range between, for example, 1 MHz and 30 MHz. The data used for the synchronisation are binary data: a first value is represented by a phase of 0 degrees of a subcarrier at 1800 Hz and a second value by a phase turned through 180 degrees relative to this same carrier. Worded differently, the data have the start values: $+1$ and $-1$.

As a result of the transmission, these values are subjected to amplitude and phase fluctuations and may even cause mutual disturbance. The receiver shown in FIG. 1 supplies at the output terminal 5 data as much as possible free from these fluctuations and this mutual disturbance.

Figure 2:
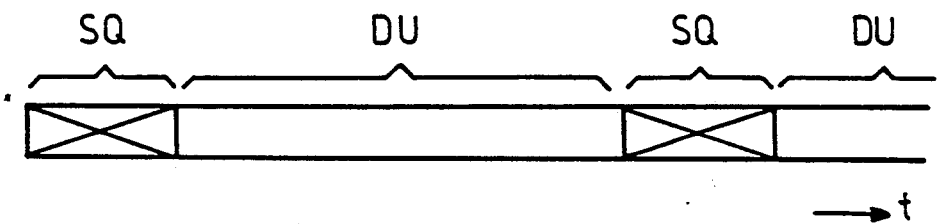
FIG. 2 illustrates a transmitted data frame.
Figure 7:
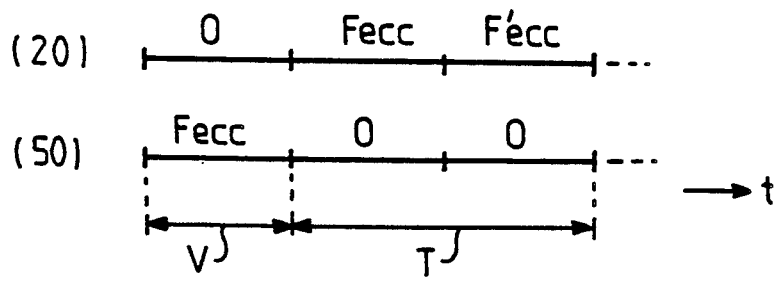
FIG. 7 shows how the error indications may be used to compensate for the frequency errors of the received carrier.

In FIG. 2 a schematic diagram is shown of a frame of received data. Thus, the sync data are represented by a sequence SQ; after this sequence come the useful data DU. It is only these data DU that appear at terminal 5. In FIG. 7 a signal is represented which indicates that a sync data sequence has been received.

In FIG. 1 reference 8 indicates the receive section of the receiver. At its output the data are transmitted by means of the subcarrier. An analog-to-digital converter 10 generates digital sub-samples at a rate N times more rapidly than the data transmission. That is to say, that for one transmitted data signal there will be N sub-samples. For the rest of the explanation, N will be assumed to be equal to 4.

A microprocessor 12 performs a processing of these samples to supply the useful information at terminals 5 and 7. For clarity, this microprocessor is shown in the form of a block diagram, but to those skilled in the art it will be evident that this diagram can be transformed into function blocks that permit interpreting by a microprocessor. The samples at the output of the converter 10 are first of all demodulated at the nominal frequency of the subcarrier at 1800 Hz. For this purpose, two multipliers 14 and 15 are used, followed by two low-pass filters 16 and 17 so that at their outputs real and imaginary data transmitted in the baseband are made to appear. Element 14 multiplies the samples by $\cos 2\pi Ft$ and element 15 by $\sin 2\pi Ft$, where F is the frequency of the subcarrier. The complex magnitude formed thus is then subjected to the operation of a phase shifter 20, which shifts the phase of the subcarrier according to a magnitude applied to its control input 21. The samples, real and imaginary portions, at the output of the phase shifter 20, are stored systematically at four successive locations (corresponding to the value N) of a buffer memory 22 having a circular addressing. This memory may contain a hundred data. This memory will be addressed in the read mode for the process which is to be described by a symbol number "ns" which defines the data and an index number "i" defining the position of the sub-sample. Thus, sub-samples contained in this memory 22 may be tapped in a selective way by an equaliser input circuit 25 on the one hand and by a synchronisation circuit 27 on the other. The output of circuit 25 is connected to the input of an equaliser 29 followed by a decision circuit 31 for providing the data at terminal 5.

The sync circuit 27 provides not only at terminal 7, the peak which indicates that a sync data sequence has been received, as has already been observed, but provides in addition:

at an output 40, an index value accompanied by a number of the symbol to indicate the number of the sub-sample to be examined by circuit 25;

at an output 42, a different index value accompanied by the symbol number for its actual processing, and at an output 44, a phase error to be used either by circuit 25 via a switch 45, or by a filter 46. The output of this filter 46 is connected to the circuit 20 by means of a switch 47. This phase error represents the difference between the nominal value of the sub-carrier and the value of the received sub-carrier, whereas this error may be caused by the Doppler effect or by frequency differences between the carriers.

The input element of equaliser 29 is formed by a phase shift circuit 50 followed by a normalising circuit 25 which center the data values so that the equalisation can be effected under the best possible conditions.

The operation of such a receiver can be divided into two modes of operation. One mode is called the stand-by mode during which a synchronisation is obtained which makes the receiver change to the traffic mode. Useful data are transmitted in the two modes.

Figure 3:
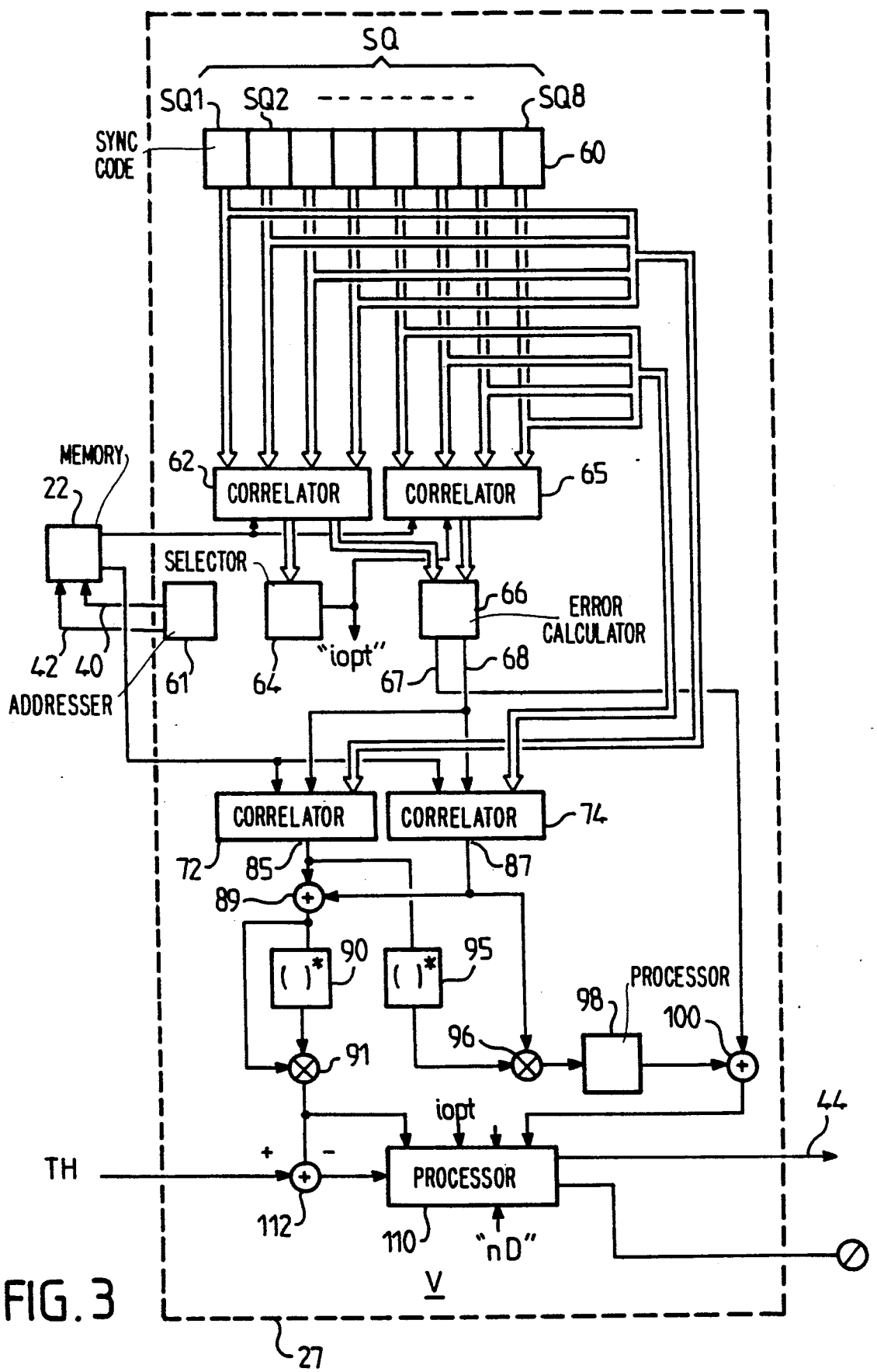
FIG. 3 is an operational diagram to explain the operation of the synchronisation in the stand-by mode.

The sync circuit 27 represented in FIG. 3 by means of function blocks is assigned to the stand-by mode. Block 60 represents the data sequence S(k) of the sync code SQ having, for example, 80 values; this code is divided into 8 parts SQ1, SQ2, ..., SQ8 of 10 values each. The received data obtained from memory 22 by means of an addressing circuit 61 are correlated by means of a circuit represented by a block 62 with these different block parts and, according to an aspect of the invention, these correlations are only effected for parts SQ1 to SQ4. From the correlations effected, a selecting circuit 64 determines for each of the four sub-samples and for each of these parts the one that provides the best result.

For this reason, "i" is determined which maximises the following formula:

$$COR(i) = \sum_{n=1}^{4} [CORPAR(i,n)]^* \cdot CORPAR(i,n) \qquad i\epsilon[1,4]$$

the value "i" giving this maximum is termed: iopt. In this formula the asterisk denotes that the conjugate is to be considered of the quantity to which it is assigned. On the other hand:

$$CORPAR(i,n) = \sum_{j=0}^{9} D(i,j + (n-1) \cdot 10) \cdot S(j + (n-1) \cdot 10) \qquad n\epsilon[1,4]$$

$$D(\ldots,\ldots)$$

represents the processed data.

The value iopt is used by a block 65 to effect correlations with these indices for the parts of the sequences SQ5 to SQ8. All these correlations with this value are used for calculating in block 66 the phase error by means of a method similar to the one described in the previously mentioned French Patent specification no 2,525,055. The following function $f(\psi)$ will be obtained:

$$f(\psi) = \sum_{n=1}^{7} [CORPAR(iopt,n)]^* \cdot CORPAR(iopt,n+1)$$

Figure 4:
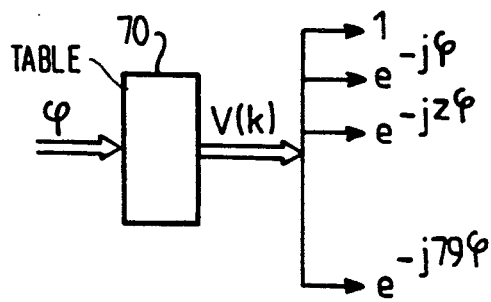
FIG. 4 shows the generation of a frequency error vector on the basis of the error indication established during the third stage.

For that matter, one may demonstrate that:

$$f(\psi) = K.exp(10.\psi)$$

where K is a constant. From this value of $\psi$ may be derived a vector V presenting a plurality of components V(k) by assigning the value of $\psi$ to a Table 70 as represented in FIG. 4.

$$V(k) = exp(-j(k-1)\psi) \qquad k\epsilon[1,80]$$

The value $\psi$ appears at output 67 and the vector V at the output 68.

Figure 5:
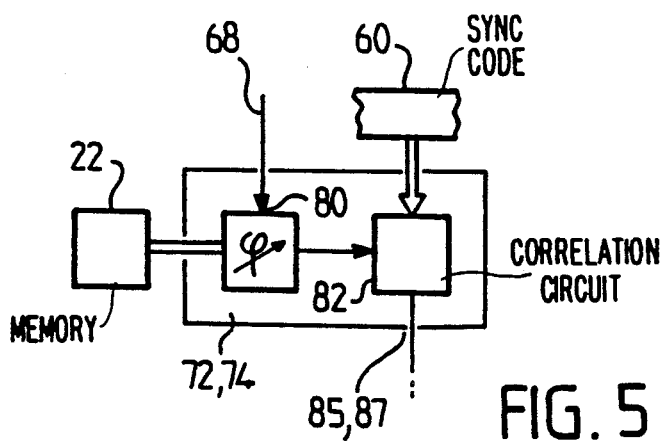
FIG. 5 shows the frequency correction produced to effect the total correlation.

Two blocks 72 and 74 effect a total correlation by influencing two halves of the code SQ. Each of these blocks comprises, as indicated in FIG. 5, a phase shifter 80 followed by a so-called correlation circuit 82; circuit 80 has its shift command coming from the output 68 for shifting the data tapped from the memory 22. Thus, this correlation will be effected under advantageous conditions because the frequency shift has already been corrected.

The correlations effected by means of the blocks 72 and 74 are respectively, CORT(iopt, 1) and CORT(iopt, 2) given by:

$$CORT(iopt,1) = \sum_{K=1}^{40} D(iopt,k) \cdot S(k) \cdot V(k)$$

$$CORT(iopt,2) = \sum_{K=41}^{80} D(iopt,k) \cdot S(k) \cdot V(k)$$

The total correlation CORTOTAL effected with all the values S(k) of the sync code is given by the sum of the correlations effected by means of the blocks 72 and 74.

$$CORTOTAL = CORT(iopt, 1) + CORT(iopt, 2)$$

This sum is formed by means of the adder 89.

The square of the modulus CORTOTAL is determined by means of the elements 90 and 91 of which one takes the conjugate value CORTOTAL of the quantity and the other multiplies these values by one another. The next quantity is also evaluated by means of a circuit 95 to determine the conjugate value of CORT(iopt, 1), and a multiplier 96.

$$[CORTS(iopt, 1)]^* \cdot CORT(iopt, 2)$$

After processing in a circuit 98, this quantity yields a phase which, added by means of an adder 100 to the one (output 67) calculated previously in block 66, improves the latter considerably.

A final block 110 processes the information at the output of circuit 91 and also that produced by a comparing circuit 112 for taking certain measures when a correlation peak has been determined by circuit 112 which compares the value of the modulus CORTOTAL to a previously established threshold value TH. One of these measures consists of defining the value "ns" for which the synchronisation has been detected. Another measure consists of storing the calculated phase value at the output of the adder 100 and "iopt".

Figure 6:
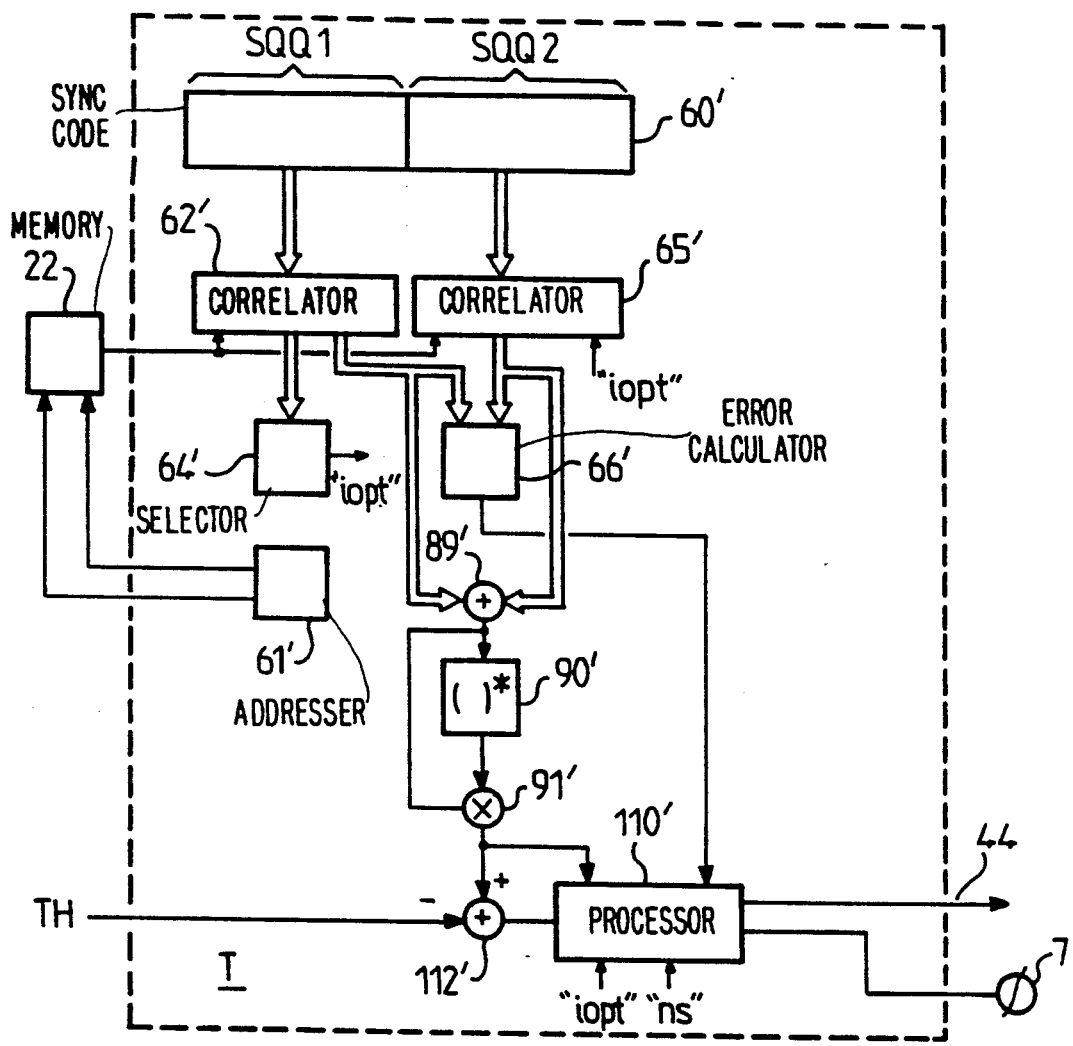
FIG. 6 is an operational diagram to explain the operation of synchronisation in the traffic mode.

Once the synchronisation has been obtained, the receiver changes to the traffic mode for the next frame. The synchronisation has thus a monitoring role, to detect whether the synchronisation code is always recognised well and also to monitor the phase in order to correct small subcarrier differences which are always possible. FIG. 6 shows how circuit 27 is structured for this mode.

In this Figure, the sync code is divided into two parts SQQ1 and SQQ2 in a block 60'. In a block 62' the correlations are estimated for all the indices "i" processed by the addressing circuit 61' with the code half SQQ1. An element 64 determines as in the standby mode the value "iopt" so that a block 65' computes the correlation for this data "iopt" with the sequence half SQQ2. On the basis of these two correlations a phase error value is determined by means of an element 66 by taking the conjugate of the correlation produced by 62' and the correlation produced by 65'. Thereafter, the total correlation is computed by adding up the correlations obtained by means of the elements 62' and 66'. The square of the modulus is obtained, as in the stand-by mode, by means of the elements 89', 90' and 91' which are similar to the elements 89, 90 and 91, described with respect to FIG. 3. The synchronisation is detected by the comparing circuit 112' and the final block 110' has the same function as the block 110. For this block the phase error under discussion is only the one produced by the element 66' on the basis of the conjugate of the correlation produced by the block 62' and that of the block 65'.

In FIG. 7 is shown how the switches 45 and 47 can be operated. When in the stand-by mode, the switch 47 is put in a position so that the phase shifter 20 does not introduce any phase correction, whereas the switch 45 is put in a position that permits the phase shifter 50 to receive already the first value found Fecc. In a next period, in the traffic mode, the switches 45 and 47 are reversed so that the filtered phase error values Fecc, F'ecc are applied to circuit 20 in each period and no further phase error is applied any more to element 50. Corrected data have thus been supplied to the equaliser 29.

I claim:

1. A method for synchronizing user data, comprising the following steps:
    receiving a plurality of N sub-samples of synchronizing data representing a synchronization sequence centered around a carrier frequency,
    effecting N first correlations of the received user data with one part of a locally generated sync sequence,
    determining the sub-sample $i_{opt}$ having the best correlation among the N first correlations,
    effecting a second correlation of said sub-sample $i_{opt}$ with the remaining part of the locally generated sync sequence, and
    producing an error indication using the results of the best correlation and the second correlation.

2. A method as claimed in claim 2, comprising the following further steps:
    effecting a third correlation of sub-samples of synchronization data corresponding to $i_{opt}$ which are phase shifted by said error indication with the whole locally generated sync sequence, and
    producing a final error indication by combining said error indication with the results of the third correlation.

3. An apparatus for synchronizing user data, comprising first means for receiving a plurality of N sub-samples of synchronizing data representing a synchronization sequence centered around a carrier frequency,
    second means for effecting N first correlations of the received user data with one part of a locally generated sync sequence,
    third means for determining the sub-sample $i_{opt}$ having the best correlation among the N first correlations,
    fourth means for effecting a second correlation of said sub-sample $i_{opt}$ with the remaining part of the locally generated sync sequence, and
    fifth means for producing an error indication using the results of the best correlation and the second correlation.

* * * * *